(12) United States Patent
Sandvoss et al.

(10) Patent No.: US 6,986,272 B2
(45) Date of Patent: Jan. 17, 2006

(54) IGNITION LOCK FOR A MOTOR VEHICLE

(75) Inventors: Ralf Sandvoss, Gerlingen (DE);
Reinhart Neumann, Moessingen (DE);
Thomas Schwarz, Wurmlingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 76 days.

(21) Appl. No.: 10/381,705

(22) PCT Filed: Sep. 27, 2001

(86) PCT No.: PCT/EP01/11185

§ 371 (c)(1),
(2), (4) Date: Sep. 8, 2003

(87) PCT Pub. No.: WO02/27123

PCT Pub. Date: Apr. 4, 2002

(65) Prior Publication Data
US 2004/0025549 A1    Feb. 12, 2004

(30) Foreign Application Priority Data
Sep. 27, 2000 (DE) .............................. 100 47 832

(51) Int. Cl.
*E05B 19/06*    (2006.01)

(52) U.S. Cl. .................... 70/409; 70/252; 70/278.1; 70/278.3; 70/389

(58) Field of Classification Search ................. 70/245, 70/252, 278.1, 409, 278.2, 278.3, 389; 307/10.1–10.3
See application file for complete search history.

(56) References Cited

U.S. PATENT DOCUMENTS

| | | | | |
|---|---|---|---|---|
| 4,898,010 A | * | 2/1990 | Futami et al. ............. | 70/278.1 |
| 5,289,707 A | * | 3/1994 | Suzuki ...................... | 70/252 |
| 5,656,867 A | * | 8/1997 | Kokubu .................... | 307/10.5 |
| 5,836,187 A | * | 11/1998 | Janssen et al. ............ | 70/252 |
| 5,982,295 A | * | 11/1999 | Goto et al. ............... | 340/10.52 |
| 6,059,687 A | * | 5/2000 | Durieux et al. ........... | 477/94 |
| 6,125,673 A | * | 10/2000 | Luker ....................... | 70/276 |
| 6,260,651 B1 | * | 7/2001 | Kokubu et al. ........... | 180/287 |
| 6,351,206 B1 | * | 2/2002 | Schweiger et al. ....... | 340/5.64 |
| 6,354,120 B1 | * | 3/2002 | Tan et al. ................. | 70/252 |
| 6,442,985 B1 | * | 9/2002 | Watanuki et al. ......... | 70/186 |

(Continued)

FOREIGN PATENT DOCUMENTS

DE    44 34 587    4/1995

(Continued)

*Primary Examiner*—Suzanne Dino Barrett
(74) *Attorney, Agent, or Firm*—Crowell & Moring LLP

(57) ABSTRACT

The invention relates to an ignition lock (1), in particular for a driving authorization system in a motor vehicle that interacts for authentication purposes with an electronic key or the like via an encoded operating signal. The ignition lock (1) contains a moving element (2) that can move from a starting position into at least one actuating position and a switching element (3), wherein the moving element (2) has a switching effect onto the switching element (3) in the actuating position. The ignition lock (1) furthermore includes a lever (4) that can be inserted into the moving element (2) for manually moving the moving element (2), wherein a locking feature (5) interacts with the lever (4) in the inserted state so that the removal of the lever (4) from the moving element (2) is blocked. The lever (4) contains an actuating element for the release of the locking feature (5) so that upon actuation of the actuating element the lever (4) can be removed from the moving element (2).

15 Claims, 5 Drawing Sheets

U.S. PATENT DOCUMENTS

| | | | |
|---|---|---|---|
| 6,539,762 B1 * | 4/2003 | Wittwer | 70/423 |
| 6,546,768 B1 * | 4/2003 | Burghoff et al. | 70/252 |
| 6,553,802 B1 * | 4/2003 | Jacob | 70/456 R |
| 6,705,531 B1 * | 3/2004 | Norton | 235/492 |
| 6,718,805 B2 * | 4/2004 | Okuno | 70/186 |
| 6,764,428 B2 * | 7/2004 | Rudolph et al. | 477/99 |
| 6,765,311 B1 * | 7/2004 | Labonde | 307/10.1 |
| 6,776,016 B1 * | 8/2004 | Wittwer et al. | 70/252 |
| 6,803,675 B2 * | 10/2004 | Harada et al. | 307/10.3 |
| 6,810,700 B2 * | 11/2004 | Okuno | 70/186 |
| 2004/0003632 A1 * | 1/2004 | Ohtaki et al. | 70/252 |

FOREIGN PATENT DOCUMENTS

| | | |
|---|---|---|
| DE | 195 04 991 | 4/1996 |
| DE | 198 39 347 | 12/1999 |

* cited by examiner

IGNITION LOCK FOR A MOTOR VEHICLE

BACKGROUND AND SUMMARY OF THE INVENTION

The invention relates to an ignition lock, in particular for a driving authorization system in a motor vehicle that interacts for authentication purposes with an electronic key.

In motor vehicles, an ignition lock is installed for protection from unauthorized usage. The ignition lock and appropriate control devices are components of the ignition lock and/or driving authorization system in the motor vehicle.

An ignition lock system acting together with an electronic key in a motor vehicle is known from DE 44 34 587 A1. The ignition lock of the ignition lock system includes a switching element as well as a rotor. Upon successful authentication of the key, which occurs via an encoded operating signal between the key located in the ignition lock and the ignition lock, the rotor can be moved from a starting position with the electronic key, which is used as a lever, into at least one actuating position. In the actuating position, the rotor has a switching effect on the switching element, whereby specific functions of the motor vehicle are effected, such as, for example, switching on the ignition and the like.

Such ignition lock systems have also been further developed with a so-called "keyless go" functionality, in which it is sufficient that the user carries the key, an identification (ID) sensor, a chip card, a smart card or the like with him. The authentication of the key or the like is then conducted automatically when the user is in the motor vehicle. For the actual starting process, the user moves for example the rotor manually via a lever that is incorporated on the rotor.

In case of a possible failure of the keyless go functionality, it is feasible to provide a kind of emergency actuation via an emergency key that can be inserted into the ignition lock. The emergency actuation is made more difficult with the lever that is incorporated on the ignition lock.

The lever, which is arranged on the ignition lock, can also make its actuation less comfortable for the user.

It is an object of the invention to further develop the ignition lock so that its actuation, in particular in the event of failure of the keyless go functionality, offers more comfort.

This object is attained with a generic ignition lock, in particular for a driving authorization system in a motor vehicle that interacts for authentication purposes with an electronic key, a chip card, an identification (ID) sensor or the like comprising a switching control element, a moving element that can move from a starting position into at least one actuating position, said moving element having a switching effect on the control element in the actuating position, and a lever that can be inserted into the moving element for the manual movement of the moving element, wherein a locking feature interacts with the lever in the inserted state so that the removal of the lever from the moving element is blocked, and the lever contains an actuating element for the release of the locking feature, so that upon actuation of the actuating element, the lever can be removed from the moving element.

The ignition lock pursuant to the invention is equipped with a separate lever, which can be inserted for moving purposes into the rotor or another moving element of the ignition lock that is displaceable suitably between the starting and the actuating positions. In the inserted state, a locking motion in the ignition lock interacts with the lever so that the removal of the lever from the rotor and/or from the moving element is blocked. The lever in turn is equipped with an actuating element for releasing the lock so that upon actuation of the actuating element the lever can be removed from the rotor and/or the moving element. Further embodiments of the invention are the object of the dependent claims.

When the moving element is designed as a rotor, an elastic force can act on the rotor in the actuating position. Due to this elastic force, which can be for example a spring force, the rotor then automatically returns into the starting position as soon as the manual actuation of the lever stops. In an ignition lock with such a design it is preferred that, proceeding from the starting position in one direction of rotation, the ignition for the motor of the vehicle is initially switched into a first actuating position. In a subsequent second actuating position the motor is started.

Proceeding from the starting position in the other direction of rotation, the ignition for the motor is switched off in a third actuating position.

It is useful when the lever is designed like an ignition key with a key bit and a grip part. The moving element can contain a holding feature, into which the key bit that serves for the insertion of the lever can be inserted. The key bit exhibits a contour that engages with the locking system in a blocking manner. The grip part by contrast protrudes from the moving element when the key bit is inserted into the holding feature for the purpose of manual movement. The emergency key can beneficially be designed like a conventional electronic ignition key and/or the conventional electronic ignition key can serve for the emergency actuation of the ignition lock.

The locking device can consist of a slide equipped with a spring. In particular a design as double slide with two slides that are displaceable in relation to each other under the force of the spring is practical. A lug on the slide engages with the contour in the key bit of the lever. It is useful to provide for the contour in the key bit a first section that runs substantially horizontally in relation to the key bit, followed by a subsequent second section that ascends in a kind of inclined plane as well as another subsequent third section having a kind of undercut design. This allows the slide to move under spring tension substantially vertically to the insertion direction when introducing the key bit into the holding feature on the second section. The slide subsequently latches into the third section with its lug due to the force of the tensioned spring.

The actuating element can be designed as a kind of sliding element, wherein the sliding element contains a taper facing the lug. The sliding element is movably seated in the grip part as well as on a guiding part on the key bit. This allows the sliding element to be inserted into the third section of the contour so that the sliding element engages in the lug of the slide through the taper in a kind of ejector. Together with the slide the lug is thus moved out of the third section of the contour against the force of the spring with an unlocked unlatching device.

A push button is preferably incorporated into the grip part on the sliding element for the actuation of the sliding element. The push button can be actuated manually together with the sliding element against the force of a pressure spring, which is supported, for example, on the key bit. In order to prevent an accidental actuation of the push button during the usual motions of the lever, it is useful to arrange the push button on the front side of the grip part lying opposite to the key bit. It is useful to design the push button substantially flush with the front side of the grip part. The surface of the part of the push button that is assigned to the front side is beneficially used for attaching a symbol, wherein the symbol can be designed, for example, as kind of an insert. In particular, the company logo of the vehicle manufacturer, the ignition lock manufacturer, or the like can be affixed on the abovementioned surface.

The advantages achieved with the invention consist particularly of the fact that the lever latches safely and captively in the ignition lock and can yet be selectively removed from the ignition lock. During normal operation of the motor vehicle thus the lever remains in the ignition lock and also must not be removed when leaving the vehicle. If required, however, the lever can be detached and removed without additional aids. Such a need may arise in the event of a failure of the keyless go functionality, for example when a malfunction exists in the authentication of the electronic key in the interior of the motor vehicle, which is required for starting up the motor vehicle. Under these circumstances, an emergency operation is possible comfortably and easily by inserting the electronic key into the ignition lock instead of the lever, which deactivates the immobilizer and allows the vehicle to be operated.

Changes on the ignition lock as such are not required despite this additional functionality.

The electronic key generally contains a transponder for transmitting a code. So as not to disrupt the transponder transmission, the housing of the electronic key is usually made of polymer. Such design restrictions, however, are beneficially eliminated for the lever. The lever can be made in particular of metal, which can be more beneficial for its utilization.

The drawings show an exemplary embodiment of the invention with various developments and arrangements, which will be described in more detail in the following.

DETAILED DESCRIPTION OF THE DRAWINGS

Figure 1:
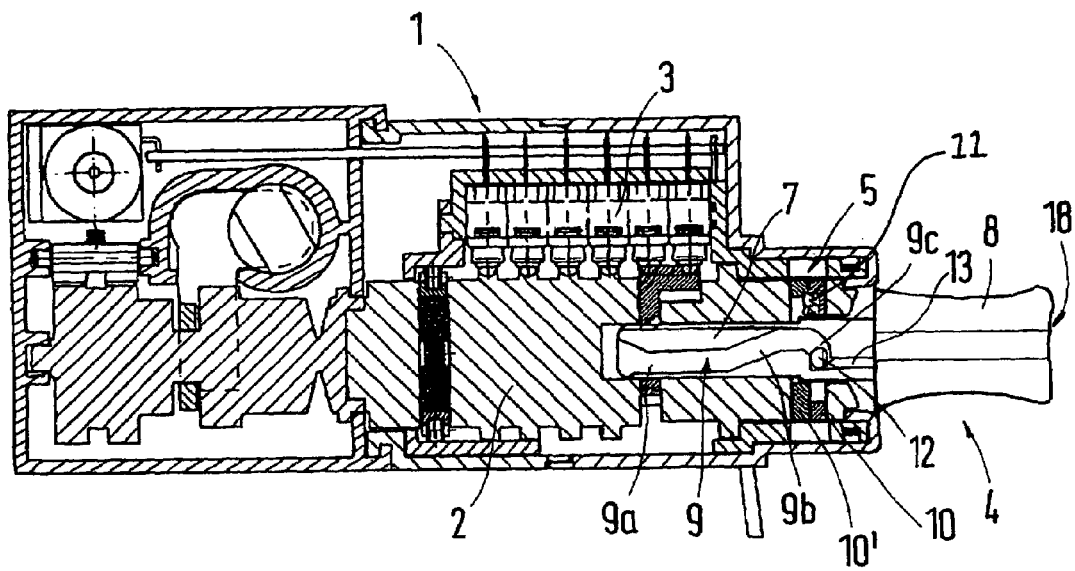
FIG. 1 is a sectional v sectional view through an ignition lock with inserted lever.

FIG. 1 shows an ignition lock 1 for a driving authorization and/or ignition lock system in a motor vehicle that interacts with an electronic key, an identification (ID) sensor, a chip card, a smart card or the like, described in the following for simplicity reasons only as key or driving authorization system. The authorized user has the key, giving him driving authorization for the motor vehicle. When the user with the key is in the interior of the motor vehicle an authentication process is conducted in accordance with a so-called keyless go functionality via an encoded operating signal between the key and the driving authorization system, upon whose successful conclusion the user can start operating the motor vehicle.

For the operation occurring after authentication, the ignition lock 1 contains a moving element 2, which can be moved from a starting position into at least one actuating position. The moving element 2 can be movable so as to slide, rotate, or be displaceable in any other suitable manner. Particularly preferred however is a rotatably designed moving element 2 in the form of a rotor, which is examined more closely in the following without restriction of this feature. The ignition lock 1 furthermore contains at least one switching element 3, wherein the rotor 2 has a switching effect on the switching element 3 in the actuating position. Finally, the ignition lock 1 contains a lever 4, which can be inserted into the rotor 2, for manually moving the rotor 2 by rotation.

For safety reasons, a locking feature 5 interacts with the lever 4 in the inserted state so that the removal of the lever 4 from the rotor 2 is blocked. The ignition lock 1 enables emergency operation without the keyless go functionality by allowing an emergency ignition key or also the electronic key itself to be inserted into the rotor 2 instead of the lever 4. For this purpose, the lever 4 must be pulled out of the rotor 2, for which the locking feature 5 must be deactivated. To achieve this, the lever 4 contains an actuating element 6 as shown schematically in FIG. 2 for releasing the locking feature 5 so that, upon actuation of the actuating element 6, the lever 4 can be removed from the rotor 2.

Various further developments and useful embodiments of the ignition lock 1 in accordance with the invention are explained in more detail in the following.

Figure 9:
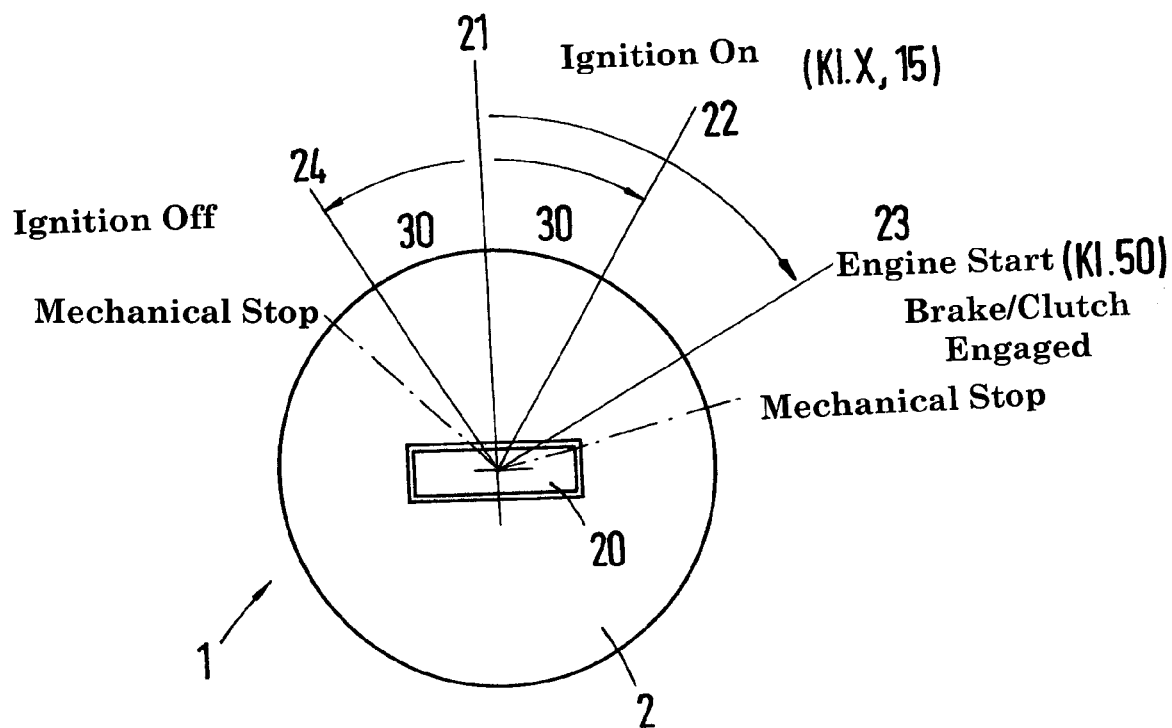
FIG. 9 shows the view of the ignition lock in the insertion direction of the lever, wherein the lever has been removed from the ignition lock.

As can be seen in FIG. 9, the rotor 2 can of course have also several actuating positions, wherein each actuating position is allocated at least one switching element 3. The rotor 2 can be rotated with the lever 4 proceeding from the starting position 21 in one direction of rotation, that is clockwise, initially into a first actuating position 22. In the first actuating position 22, the ignition for the motor of the vehicle is switched on. In a subsequent second actuating position 23, to which the rotor 2 can be further turned, the motor of the vehicle is started. When, proceeding from the starting position 21, the rotor 2 is rotated in the other direction of rotation that is counter-clockwise, into a third actuating position 24, the ignition of the motor of the vehicle is switched off. In such an embodiment it is possible that in the actuating positions 22, 23, 24, respectively, an elastic force acts on the rotor 2. Due to this force, the rotor 2 then returns automatically to the starting position 21 when the manual application of the lever 4 stops, so that the rotor 2 is to be operated from the respective starting position 21. The elastic force can be a spring force.

Figure 2:
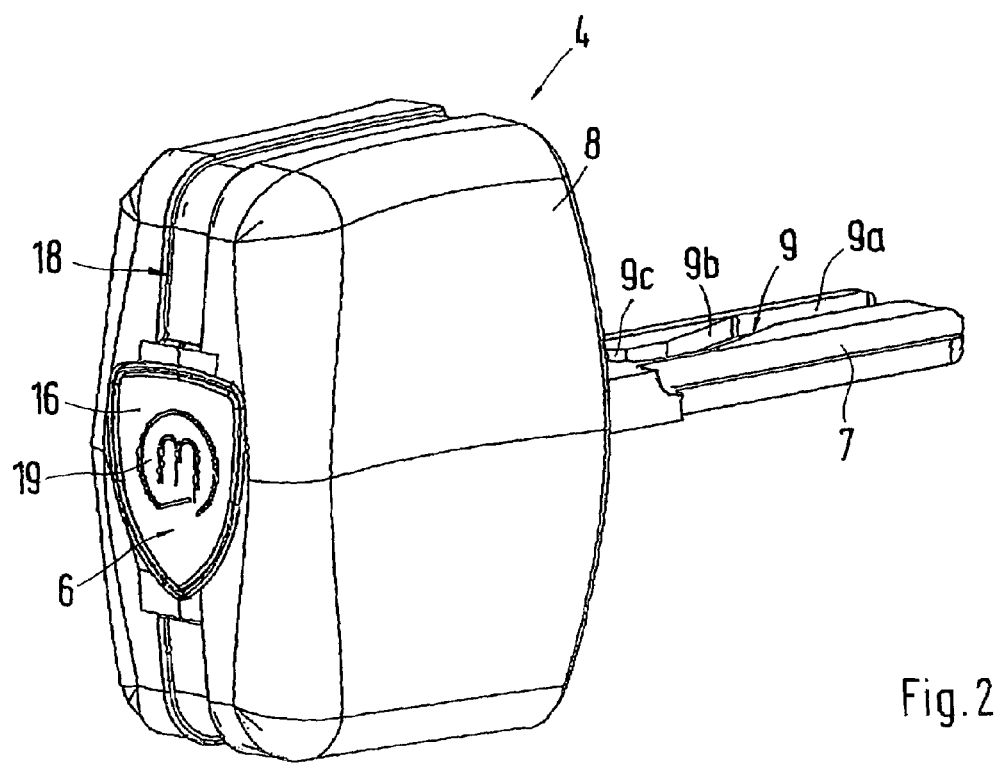
FIG. 2 shows the lever in a perspective view.

The lever 4 is preferably designed as a kind of ignition key with a key bit 7 and a grip part 8, as is shown in more detail in FIG. 2. The rotor 2 has a holding feature 20, visible in FIG. 9, into which the key bit 7 that serves for the insertion of the lever 4 into the rotor 2 can be introduced. The key bit 7 exhibits a contour 9, with which the locking feature 5 engages in a blocking manner. The grip part 8 protrudes from the rotor 2 when the key bit 7 is inserted into the holding feature 20 for the purpose of manual movement, as can be seen in FIG. 1.

Figure 4:
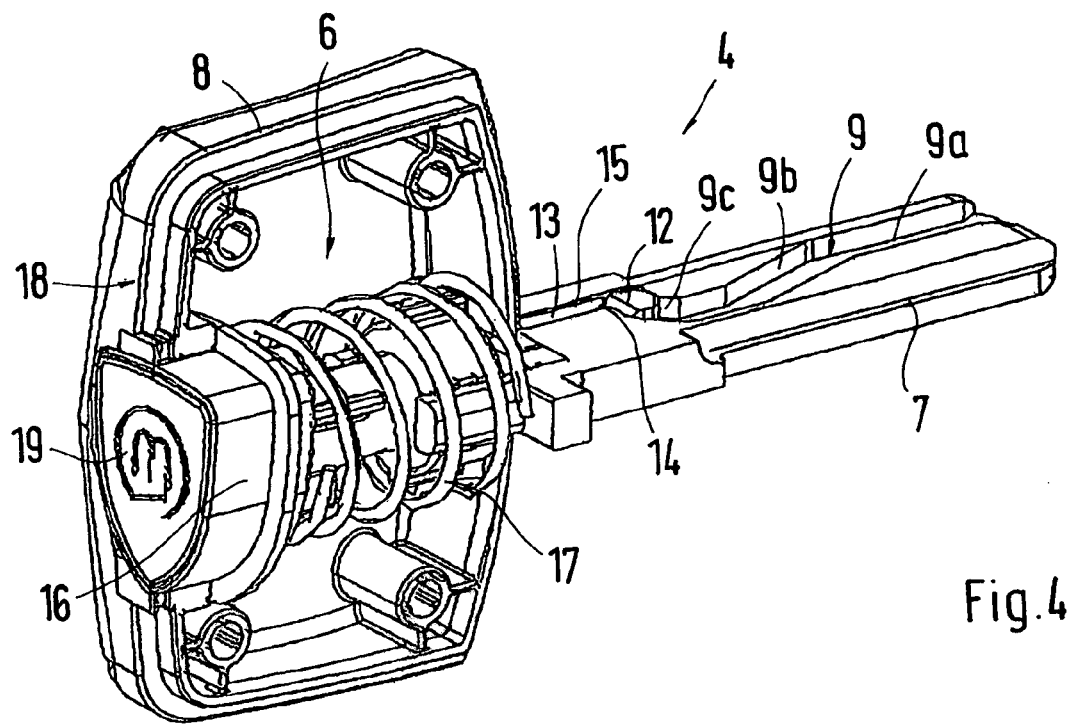
FIG. 4 shows the lever with an opened grip part.
Figure 5:
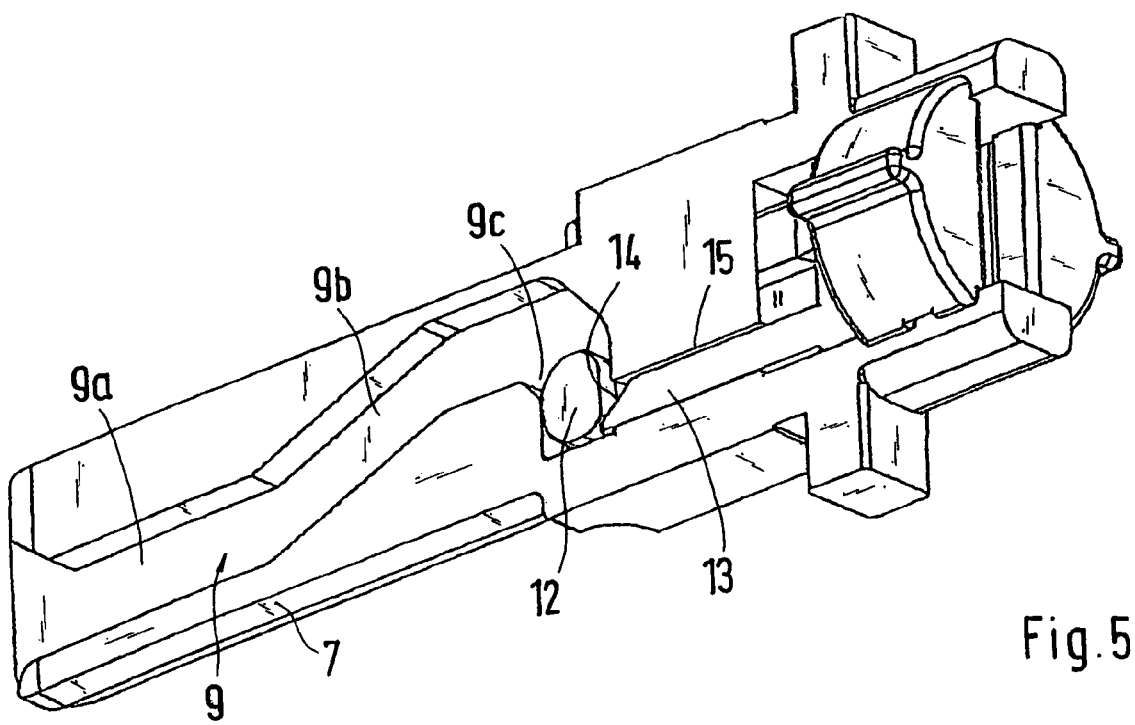
FIG. 5 shows the key bit of the lever in perspective view.

The locking feature 5 can consist of a slide 10 equipped with a spring, wherein in FIG. 1 the spring is shown only schematically in the partially broken depicted slide 10. It is in particular a double slide with two slides 10, 10', which can be moved against each other under the force of the spring. A lug 12 on the slide 10, 10' engages with the contour 9 in the key bit of the lever 4. It is useful when the contour 9 in the key bit 7 has a first section 9a that runs substantially horizontally with respect to the key bit 7, followed by a subsequent second section 9b that ascends in a kind of inclined plane, as well as another subsequent third section 9c that has a kind of undercut design, which is shown in FIG. 4 or 5. This allows the slide 10, 10' to move under tension of the spring substantially vertically to the insertion direction when introducing the key bit 7 into the holding feature 20 at the second section 9b. The slide 10, 10' subsequently latches into the third section 9c with its lug 12 due to the force of the tensioned spring.

Figure 3:
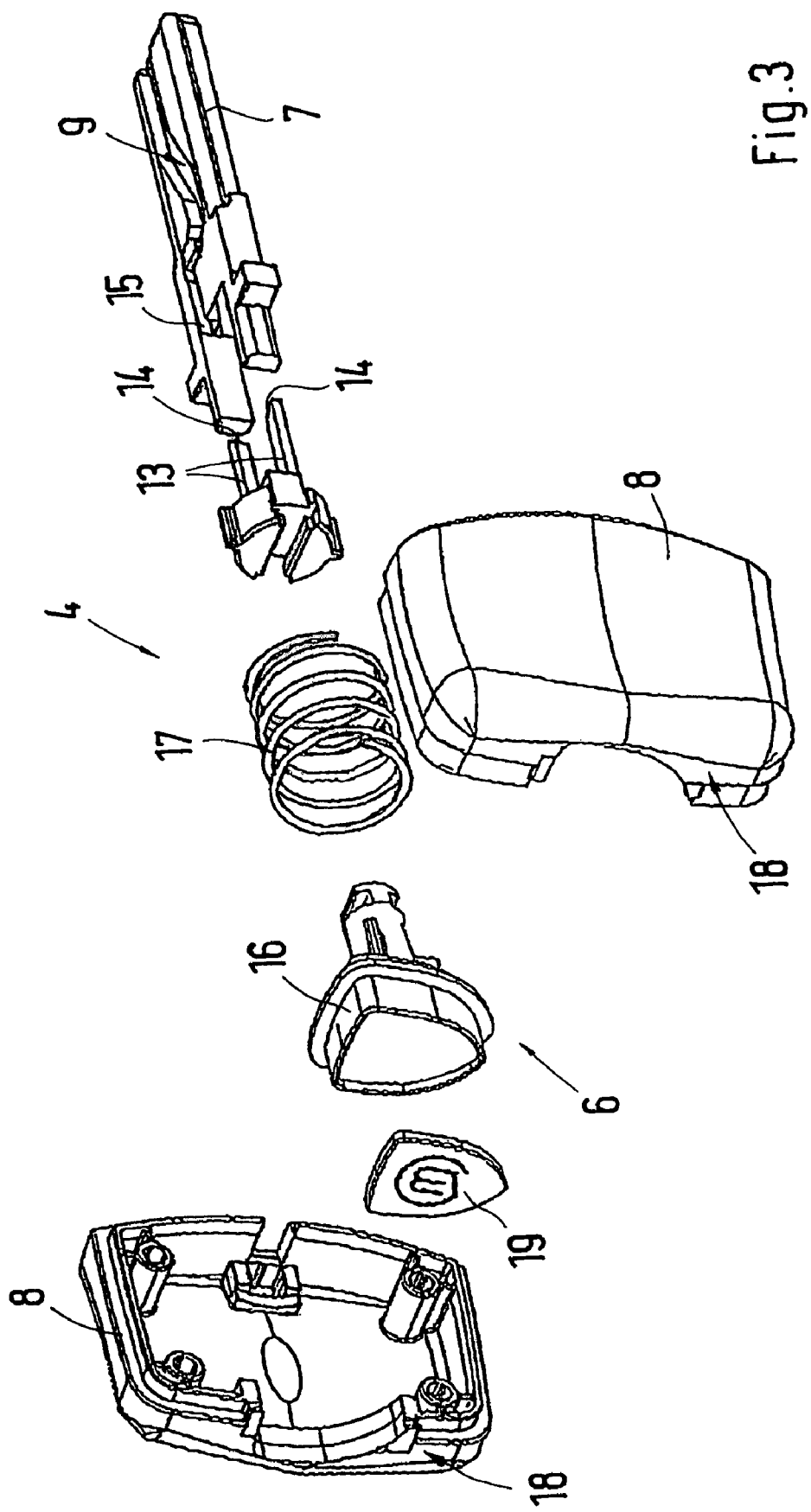
FIG. 3 shows the lever in an exploded view.
Figure 6:
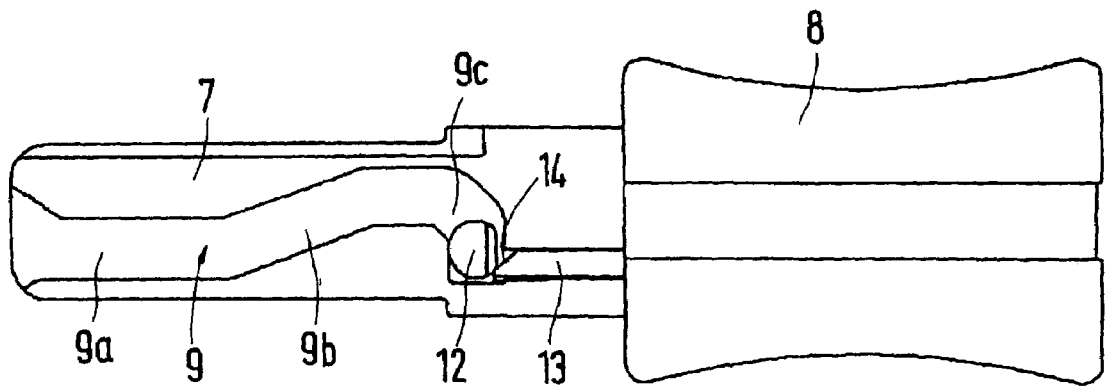
FIG. 6 is a schematic view of the lever in the locked state.
Figure 7:
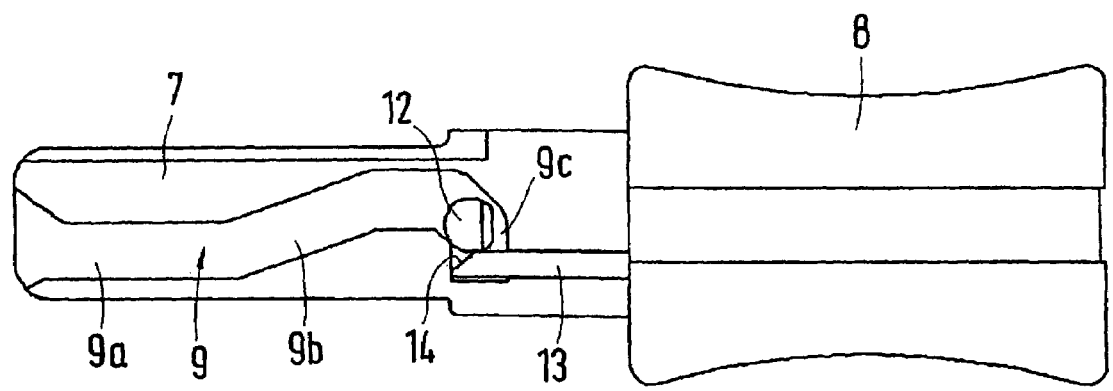
FIG. 7 is a schematic view of the lever during unlocking.
Figure 8:
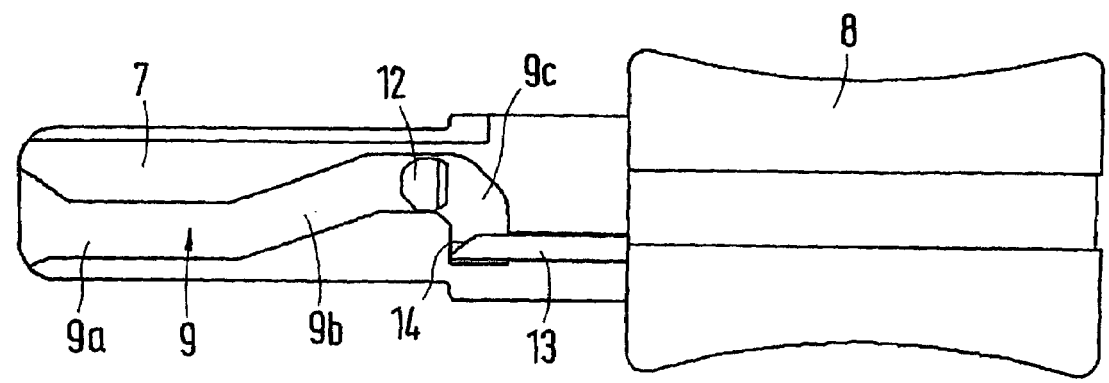
FIG. 8 is a schematic view of the lever in the unlocked state.

As is shown more closely in FIG. 3, the actuating element 6 can be configured as a kind of sliding element 13. The sliding element 13 contains a taper 14 facing the lug 12. Furthermore the sliding element 13 is movably seated in the grip part 8 as well as on a guiding part 15 at the key bit 7. This allows the sliding element 13 to be inserted into the third section 9c of the contour 9 so that the sliding element 13 engages in the lug 12 of the slide 10, 10' with its taper 14 in a kind of ejector, which can be seen in FIG. 5. Together with the slide 10, 10', the lug 12 is thus moved out of the third section 9c of the contour 9 against the force of the spring with an unlocked unlatching device. This sequence of movements is shown more closely in FIGS. 6 through 8. In FIG. 6, the taper 14 of the sliding element 13 engages with the lug 12, which is latched in the third section 9c and is also in the locked state. In accordance with FIG. 7, the sliding element 13 has an unlatching effect on the lug 12 and moves the lug 12 out of the third section 9c. In FIG. 8 then the lug 12 is moved from the third section 9c into the second section 9b, wherein the lug 12 is unlatched as well as unlocked so that the lever 4 can be removed from the ignition lock 1.

FIG. 4 furthermore shows that a push button 16 is incorporated in the grip part 8 on the sliding element 13 so that the user can actuate the sliding element 13 manually via the push button 16. The actuation occurs against the force of a pressure spring 17, which is supported by the grip part 8 on the key bit 7. It may be useful to arrange the push button 16 on the front side 18 of the grip part 8 opposite the key bit 7, preventing the accidental actuation of the actuating element 6 by the user during the manual actuation of the lever 4. It is useful to design the push button 16 substantially flush with the front side 18 of the grip part 8, as can be seen in particular in FIG. 2. On the part of the push button 16 that is assigned to the front side 18 can be affixed a symbol 19, in particular one like the one shown in FIG. 2, such as for example the company logo of the vehicle manufacturer or the like. It may be useful to arrange the symbol 19 in a kind of insert on the push button 16, as shown in FIG. 3. The insert as well as the key bit 7 can be made of metal, while the push button 16 as well as the grip part 8 can be made of polymer.

The invention is not limited to the embodiment described and shown herein. It rather comprises also all expert further developments within the framework of the inventive idea. Therefore, the invention can be used not only for ignition locks on any vehicle, but also on other locks, for example those arranged on driven machines, machine tools and the like.

What is claimed is:

1. Ignition lock, in particular for a driving authorization system in a motor vehicle that interacts for authentication purposes with an electronic key, a chip card, or an identification sensor, comprising:
    a switching control element,
    a moving element that can move from a starting position into at least one actuating position, said moving element having a switching effect on the control element in the actuating position, and
    a lever that can be inserted into the moving element for the manual movement of the moving element,
    wherein a locking feature interacts with the lever in the inserted state so that the removal of the lever from the moving element is blocked,
    wherein the lever contains an actuating element for the release of the locking feature, so that upon actuation of the actuating element, the lever can be removed from the moving element,
    wherein the moving element is designed as a rotor which can be rotated from the starting position into the actuating position via the lever, and
    wherein in the actuating position an elastic force acts upon the rotor so that the rotor automatically returns to the starting position when the manual actuation on the lever stops, and furthermore, preferably proceeding from the starting position in the one direction of rotation initially in a first actuating position, the ignition of the motor is switched on, in a subsequent second actuating position the motor is started and, proceeding from the starting position in the other direction of rotation in a third actuating position, the ignition of the motor is switched off.

2. Ignition lock, in particular for a driving authorization system in a motor vehicle that interacts for authentication purposes with an electronic key, a chip card, or an identification sensor, comprising:
    a switching control element,
    a moving element that can move from a starting position into at least one actuating position, said moving element having a switching effect on the control element in the actuating position, and
    a lever that can be inserted into the moving element for the manual movement of the moving element,
    wherein a locking feature interacts with the lever in the inserted state so that the removal of the lever from the moving element is blocked,
    wherein the lever contains an actuating element for the release of the locking feature, so that upon actuation of the actuating element, the lever can be removed from the moving element,
    wherein the lever is designed in the form of an ignition key with a key bit and a grip part,
    wherein the moving element contains a holding feature into which the key bit, which serves for the insertion of the lever can be introduced,
    wherein the key bit exhibits a contour with which the locking feature engages in a blocking manner, and
    wherein the grip part protrudes from the moving element when the key bit is inserted into the holding feature for the manual movement.

3. Ignition lock pursuant to claim 1, wherein the lever is designed in the form of an ignition key with a key bit and a grip part,
    wherein the moving element contains a holding feature into which the key bit, which serves for the insertion of the lever can be introduced,
    wherein the key bit exhibits a contour with which the locking feature engages in a blocking manner, and
    wherein the grip part protrudes from the moving element when the key bit is inserted into the holding feature for the manual movement.

4. Ignition lock pursuant to claim 2, wherein the locking feature comprises a double slide equipped with a spring, that can be moved against each other under the force of the spring, and
    wherein a lug on the slide engages with the contour in the key bit of the lever, and the contour in the key bit includes a first section that runs substantially horizontally with respect to the key bit, followed by a subsequent second section that ascends in an inclined plane as well as another subsequent third section that has a kind of undercut design, in such a way that the slide can be moved under tension of the spring substantially perpendicularly to the insertion direction when the key bit is introduced into the holding feature at the second section and subsequently latches into the third section due to the force of the tensioned spring.

5. Ignition lock pursuant to claim 3, wherein the locking feature comprises a double slide equipped with a spring, that can be moved against each other under the force of the spring, and wherein a lug on the slide engages with the contour in the key bit of the lever, and the contour in the key bit includes a first section that runs substantially horizontally with respect to the key bit, followed by a subsequent second section that ascends in an inclined plane as well as another subsequent third section that has a kind of undercut design, in such a way that the slide can be moved under tension of the spring substantially perpendicularly to the insertion direction when the key bit is introduced into the holding feature at the second section and subsequently latches into the third section due to the force of the tensioned spring.

6. Ignition lock pursuant to claim 4, wherein the actuating element is designed in the form of a sliding element with a taper facing the lug, the sliding element being movably seated in the grip part as well as on a guiding part on the key bit, and furthermore the sliding element can be inserted into the third section of the contour so that the sliding element, in particular its taper, engages with the lug of the slide like a kind of ejector, and wherein the lug together with the slide is moved against the force of the spring out of the third section of the contour with an unlocked unlatching device.

7. Ignition lock pursuant to claim 5, wherein the actuating element is designed in the form of a sliding element with a taper facing the lug, the sliding element being movably seated in the grip part as well as on a guiding part on the key bit, and furthermore the sliding element can be inserted into the third section of the contour so that the sliding element, in particular its taper, engages with the lug of the slide like a kind of ejector, and wherein the lug together with the slide is moved against the force of the spring out of the third section of the contour with an unlocked unlatching device.

8. Ignition lock pursuant to claim 5, wherein the grip part on the sliding element is a push button attached for actuating the sliding element; and wherein the push button together with the sliding element can preferably be actuated manually against the force of a pressure spring which is supported particularly by the key bit.

9. Ignition lock pursuant to claim 7, wherein the grip part on the sliding element a push button is attached for actuating the sliding element; and wherein the push button together with the sliding element can preferably be actuated manually against the force of a pressure spring which is supported particularly by the key bit.

10. Ignition lock pursuant to claim 8, wherein the push button is arranged on the front side of the grip part opposite the key bit.

11. Ignition lock pursuant to claim 9, wherein the push button is arranged on the front side of the grip part opposite the key bit.

12. Ignition lock pursuant to claim 10, wherein the push button is arranged substantially flush with the front side of the grip part; and wherein a symbol, such as the company logo of a vehicle manufacturer or the like, for example in the form of an insert, is affixed to the part of the push button that is assigned to the front side.

13. Ignition lock pursuant to claim 11, wherein the push button is arranged substantially flush with the front side of the grip part; and wherein a symbol, such as the company logo of a vehicle manufacturer or the like, for example in the form of an insert, is affixed to the part of the push button that is assigned to the front side.

14. An ignition lock assembly for a vehicle comprising:

including a vehicle side lock and a key lever selectively insertable into the vehicle side lock, said vehicle side lock comprising:

a moving element movable from a starting position to at least one actuating position to switch a switching control element, and a locking device operable to lock the key lever in said vehicle side lock, wherein said key lever includes a manually actuable releasing device which is operable to release the locking device and permit removal of the key lever from the vehicle side lock, wherein the locking device includes a spring loaded member engageable on a groove in the key lever, and wherein the releasing device includes a spring biased push button which is operable to move the spring loaded member of the lock device in said groove to a position permitting removal of the key lever from the vehicle side lock.

15. An ignition lock assembly according to claim 14, wherein said groove in the key lever includes an axially open end section permitting insertion of the key lever in the vehicle side lock with guiding of the spring loaded member of the vehicle side lock in said groove.

* * * * *